United States Patent [19]
Moretti, Jr.

[11] 3,779,411
[45] Dec. 18, 1973

[54] LOW BED TRAILER FOR HEAVY EQUIPMENT

[76] Inventor: Joseph G. Moretti, Jr., 2455 N.W. 6th St., Miami, Fla. 33127

[22] Filed: Dec. 11, 1972

[21] Appl. No.: 314,235

[52] U.S. Cl. .................................. 214/505, 214/85
[51] Int. Cl. ............................................. B60p 1/04
[58] Field of Search ..................... 214/505, 506, 85, 214/85.1, 512

[56] References Cited
UNITED STATES PATENTS
2,389,211  11/1945  Pointer .............................. 214/505
3,584,754   6/1971  Moll .................................. 214/505

*Primary Examiner*—Albert J. Makay
*Attorney*—Salvatore G. Militana

[57] ABSTRACT

A low bed trailer for hauling heavy equipment having a horizontally disposed bed positioned at a substantially lower level than that of the rear loading platform and the gooseneck between which the bed is mounted; the bed having equipment supporting deck means pivoted at one end to the forward end portion of the deck and power operated lift means for raising the other end of the deck to the level of the rear loading platform whereby equipment may be rolled from the rear loading platform onto the equipment supporting deck; then the latter is pivoted downwardly to its horizontal and lowermost position to provide the equipment with a minimum overhead clearance and the combined trailer and equipment with the center of gravity thereof at absolute minimum of height above the ground for safe hauling.

2 Claims, 5 Drawing Figures

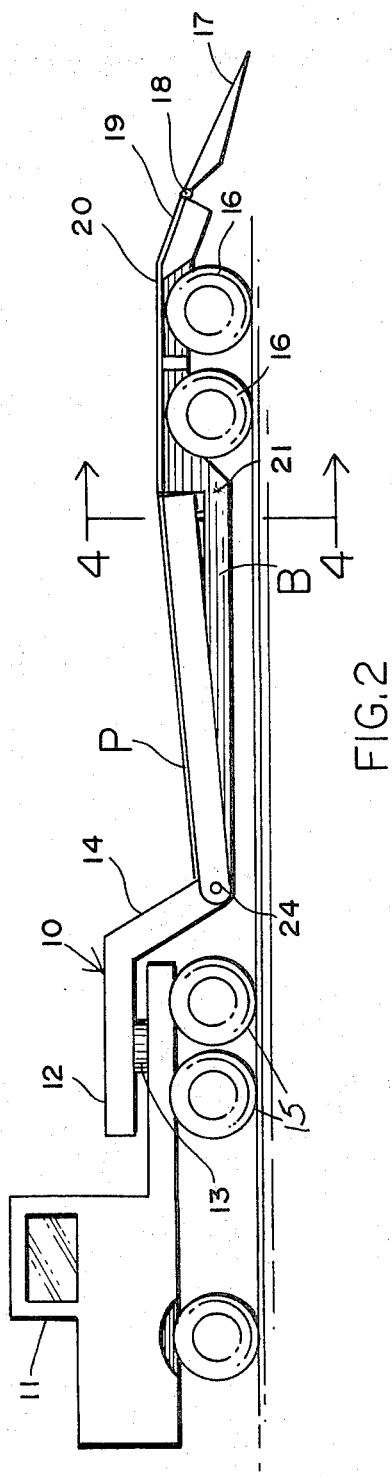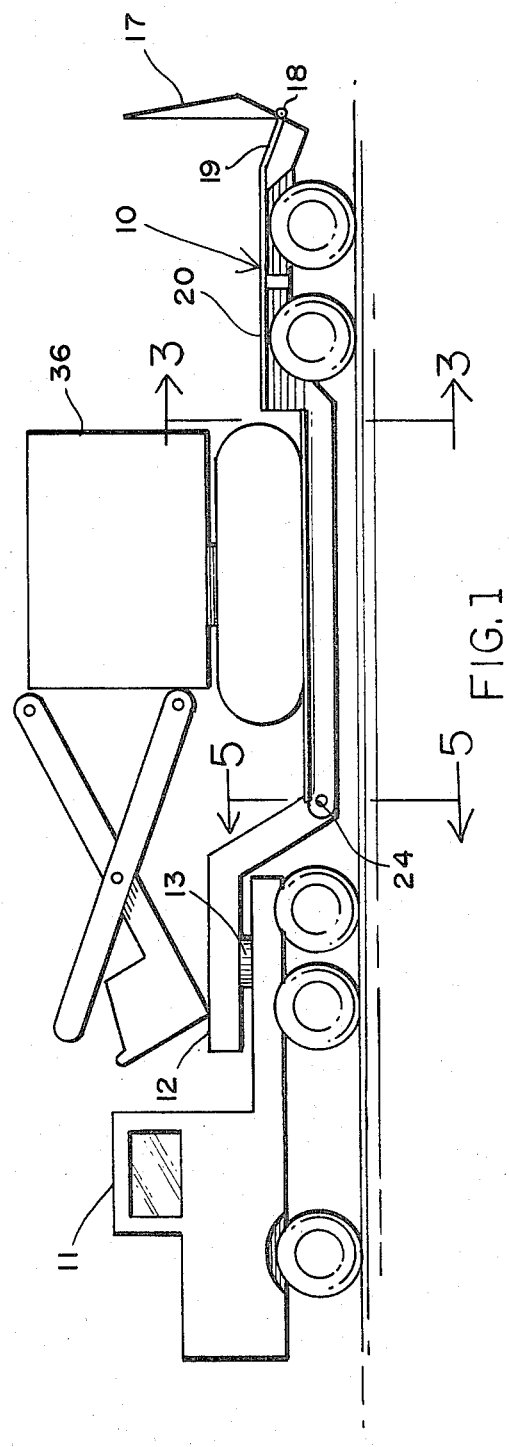

LOW BED TRAILER FOR HEAVY EQUIPMENT

BACKGROUND OF THE INVENTION

1. Field Of The Invention

This invention relates to trailers and is more particularly directed to low bed trailers for carrying heavy equipment.

2. Description of The Prior Art

Trailers for hauling large, heavy and tall equipment must have a bed for supporting the equipment positioned as low as possible above the ground and must use as large a combined wheel and tire as possible. Large wheels and tires permit the carrying of extremely heavy loads, such as farming and construction equipment and provides a greater braking power than small wheels and tires. However, the disadvantages resulting from the use of large wheels and tires are that the center of gravity of the equipment becomes too high above the ground so that the equipment when being carried at fairly high speeds on the highway, there is a danger of tipping or overturning the trailer. Also, there is a legal limit to the height of trailers and equipment being carried that compels the bed carrying equipment to be as close to the ground as possible.

At the present time, there are two types of low bed trailers using large wheels and tires; one type has a means for disconnecting the gooseneck from the trailer bed, lowering the freed end of the trailer bed to the ground and then roll the equipment on or off the trailer bed. This low bed trailer is complicated in construction and consequently very expensive in cost. Also, the time consumed in loading and unloading equipment is considerable since the trailer has to be disconnected or taken apart and then the load carrying portion must be lowered and raised and reconnected together again.

The second type of low bed trailers using large wheels and tires provides a ramp between the rear platform or deck above the wheels and the trailer bed to permit the equipment to be rolled from the rear platform to the trailer bed. This, of course, results in a trailer that is long and is not only cumbersome but dangerous to handle when on the highway.

SUMMARY OF THE INVENTION

The present invention contemplates avoiding the disadvantages of the conventional low bed trailers for heavy equipment while still utilizing large wheels and tires without having a complicated and expensive trailer or having to lengthen the trailer.

Therefore, a principal object of the present invention is to provide a low bed trailer for heavy and large equipment that is simple and relatively inexpensive in cost and one which requires no greater loading and unloading time requirement.

Another object of the present invention is to provide a low bed trailer using large wheels and tires whose center of gravity is relatively low and which provides a minimum of overhead clearance for the equipment being carried by the trailer.

A further object of the present invention is to provide a trailer whose bed for carrying equipment is normally at a lower level than the gooseneck and the rear loading platform and pivoted at one end to permit the other end to be raised to the level of the rear platform so that equipment may be rolled directly from the rear platform to the bed and then lowered to its normal horizontal position.

With these and other objects in view, the invention will be best understood from a consideration of the following detailed description taken in connection with the accompanying drawings forming a part of this specification, with the understanding, however, that the invention is not confined to any strict conformity with the showing of the drawings mut may be changed or modified so long as such changes or modifications mark no material departure from the salient features of the invention as expressed in the appended claims.

BRIEF DESCRIPTION OF THE DRAWING

In the drawing:

FIG. 1 is a side elevational view of a low bed trailer for heavy equipment constructed in accordance with my invention and shown with a piece of equipment in dotted lines.

FIG. 2 is a similar view with the bed elevated for moving the equipment therealong.

DESCRIPTION OF THE PREFERRED EMBODIMENT

Figure 3:
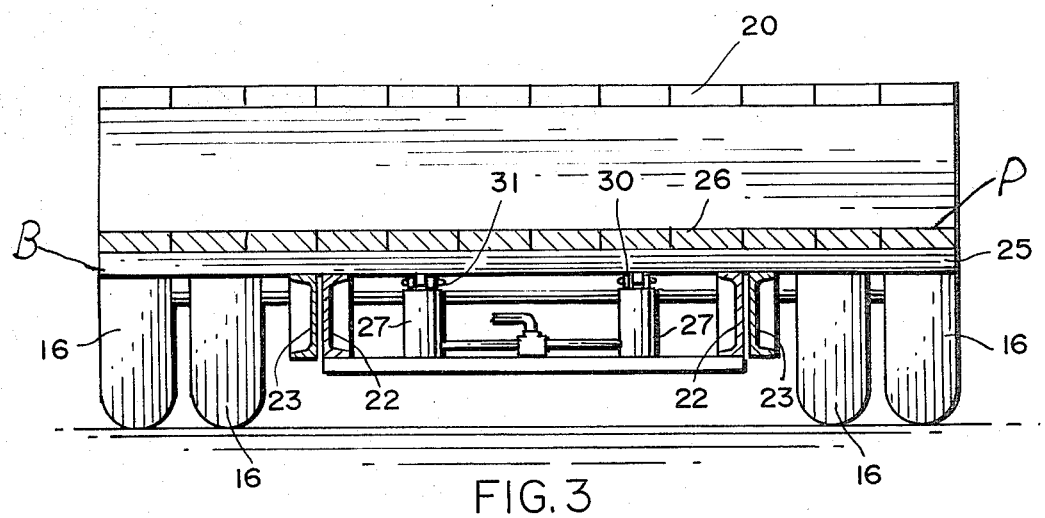
FIG. 3 is a cross sectional views taken along the line 3—3 of FIG. 1.
Figure 4:
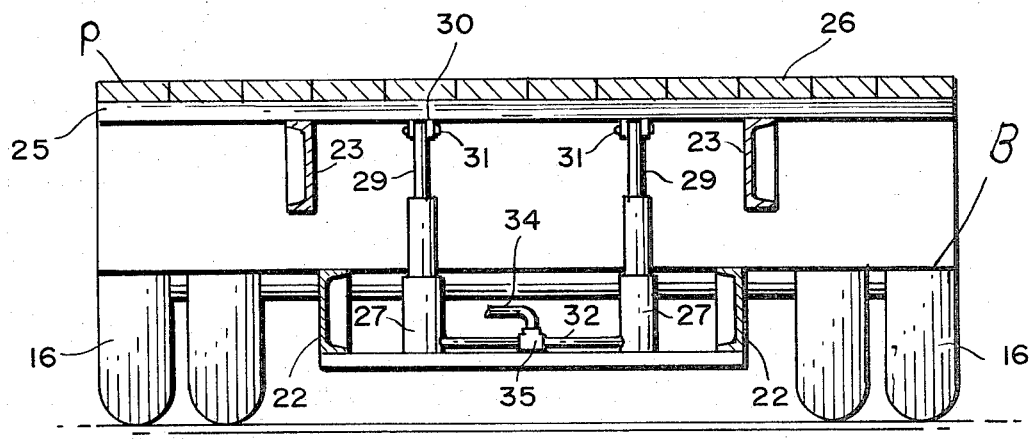
FIG. 4 is a cross sectional view taken along the line 4—4 of FIG. 2.
Figure 5:
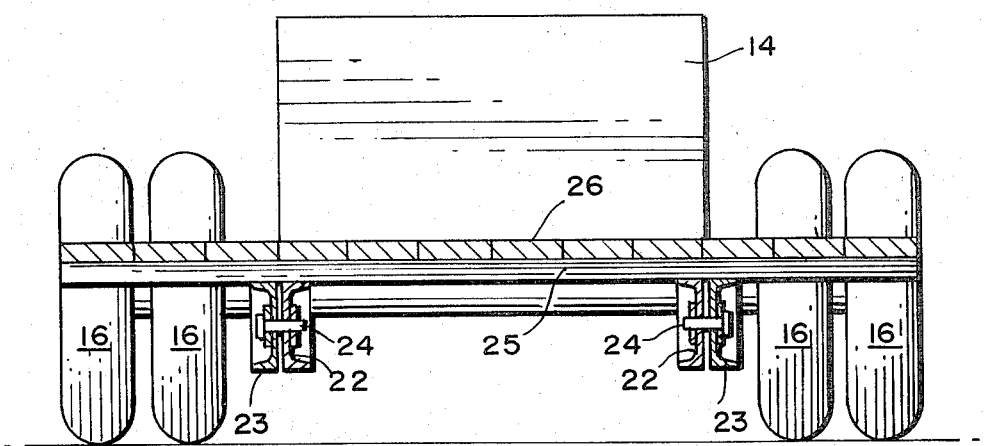
FIG. 5 is a cross sectional view taken along the line 5—5 of FIG. 3.

Referring to the drawing wherein like numerals are used to designate like parts throughout the several views, the numeral 10 refers to a low bed trailer for carrying heavy equipment shown connected to a trailer truck 11 shown only in part, since the truck 11 forms no part of the present invention. The low bed trailer 10 consists of the conventional tongue 12 which is pivotally connected to the fifth wheel 13 mounted on the trailer tractor 11. The tongue 12 which is elevated is connected to intermediate frame portion 14 extends downwardly to a low bed frame —B— that is horizontally disposed and positioned close to the pavement or road upon which the large wheels 15 and 16 of the tractor and trailer respectively.

At the rear end portion of the low bed trailer 10 is a conventional loading ramp 17 hinged as at 18 to an inclined portion 19 of the rear platform 20 which extends horizontally at the same height as the trailer wheels 16 above the road bed. The forward end portion of the rear platform 20 is connected to the low bed —B— by diagonally extending frame members 21.

The bed frame —B— is comprised of the usual fixed longitudinal beams 22 that extend the length of the low bed —B— secured at the ends to the intermediate frame 14 and inclined rear members 21. The fixed beams 22 support a pivoted load supporting platform —P— at the forward end portion of longitudinal beams 23 as at pivot pins 24. Mounted on the pivoted beams 23 are cross frame members 25 which support a wood decking 26.

The pivoted platform or bed —P— is raised or lowered at its rear portion by a pair of conventional hydraulic cylinders 27 supported on a platform 28 with piston rods 29 extending upwardly and pivotally connected as at 31 to brackets 30 secured to the lower surface of one of the cross frame members 25. The base portion of the cylinders 27 are connected together by a pipe 32 having a fitting 33 for connecting the latter to a pipe 34 that extends to a source of fluid under pressure (not shown).

From the above description of my low bed trailer 10 taken in connection with the drawings, when it is desired to haul a piece of equipment such as a power shovel 36, the loading ramp 17 is pivoted on its hinge 18 to its lowered position as shown by FIG. 2. Then its hydraulic system (not shown) is actuated to direct fluid under pressure through pipes 34, 32 and into the hydraulic cylinders 27 to cause the piston rods 29 to slide upwardly and the platform 26 to pivot about its pivot pins 24 until the rear portion of the platform 26 arrives at the level of the rear platform 20 as shown by FIG. 2. Now the power shovel 36 is rolled up the ramp 17 along the rear platform 20 and down the low bed platform 26 until the entire power shovel 36 rests on the platform 26 and is clear of the intermediate frame 14 and the forward edge portion of the rear platform 20. Now the fluid pressure in the hydraulic cylinders 27 is released and the pivoted platform 28 is pivoted downwardly until the latter comes to rest on the frame members 22 when the platform —P— will have assumed the horizontal position as shown by FIG. 1. The trailer 10 along with its cargo 36 is ready to be hauled away by the tractor 11, the power shovel 36 having reduced its overall height above the ground to a minimum by its being carried on the low bed —B— of my trailer 10. It is to be noted that by virtue of the particular construction of my low bed trailer 10, the tires and wheels 15 and 16 may be as large as desred in conformity with the load to be carried and the bed —B— may be positioned at any level above the ground without affecting the loading and unloading capabilities of my low bed trailer 10.

Having disclosed my invention, what I claim as new and desire to secure by Letters Patent of the United States is:

1. A low bed trailer for hauling heavy equipment having a tongue portion for connecting to a tractor, a rear platform portion and a substantially horizontally disposed bed portion mounted between said tongue portion and said rear platform portion, said bed portion being positioned at a lower level than said tongue portion and said rear platform portion, said bed portion comprising substantially elongated support members secured at their ends to said tongue portion and said rear platform portion, equipment carrying deck means supported on said support members, pivot means pivotally securing said deck means at one end to said support means in proximity of said tongue portion with the other end of said deck means terminating adjacent to said rear platform portion and power operated lift means operatively connected to said deck means whereby upon the upward pivotal movement of said other end of said deck means to substantially the height of said rear platform portion so that equipment may be rolled from said rear platform portion directly onto said deck means and upon the lowering of said deck means, said equipment is carried by said deck means in a substantially horizontal position and at a lower level then said platform portion.

2. The structure as recited by claim 1 taken in combination with ramp means and pivot means securing said ramp means to said platform portion for rolling said equipment from road level to said platform portion.

* * * * *